(12) United States Patent
Jeong et al.

(10) Patent No.: US 11,054,024 B2
(45) Date of Patent: Jul. 6, 2021

(54) TRANSMISSION SYSTEM BASED ON SHIFT BY WIRE AND METHOD FOR CONTROLLING THE SAME

(71) Applicants: HYUNDAI MOTOR COMPANY, Seoul (KR); KIA MOTORS CORPORATION, Seoul (KR)

(72) Inventors: Sang Hyun Jeong, Hwaseong-si (KR); Gyeong Cheol Kim, Hwaseong-si (KR); Dae Won Yang, Seongnam-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 33 days.

(21) Appl. No.: 16/661,725

(22) Filed: Oct. 23, 2019

(65) Prior Publication Data
US 2020/0332887 A1    Oct. 22, 2020

(30) Foreign Application Priority Data
Apr. 16, 2019 (KR) ......................... 10-2019-0044232

(51) Int. Cl.
| F16H 61/08 | (2006.01) |
| F16H 61/32 | (2006.01) |
| F16H 63/34 | (2006.01) |
| F16H 61/04 | (2006.01) |
| F16H 59/78 | (2006.01) |
| F16H 59/36 | (2006.01) |
| F16H 59/14 | (2006.01) |

(52) U.S. Cl.
CPC ............. *F16H 61/08* (2013.01); *F16H 59/14* (2013.01); *F16H 59/36* (2013.01); *F16H 59/78* (2013.01); *F16H 2061/0459* (2013.01); *F16H 2306/21* (2013.01)

(58) Field of Classification Search
CPC .......... F16H 61/08; F16H 59/14; F16H 59/36; F16H 59/78; F16H 2061/0459; F16H 2061/062; F16H 2061/326; F16H 2061/2823; F16H 2306/21; F16H 63/3458; F16H 63/3466
See application file for complete search history.

(56) References Cited

U.S. PATENT DOCUMENTS

| 5,053,960 A | * | 10/1991 | Brekkestran | ........ F16H 61/0246 701/51 |
| 5,125,294 A | * | 6/1992 | Takashi | ............... F16H 61/0437 477/154 |
| 2015/0160640 A1 | * | 6/2015 | Yamada | ................ H02P 29/027 318/635 |
| 2018/0149129 A1 | * | 5/2018 | Kamada | .................. F16H 63/50 |
| 2018/0363771 A1 | * | 12/2018 | Yang | ...................... F16H 61/12 |

* cited by examiner

*Primary Examiner* — Tisha D Lewis
(74) *Attorney, Agent, or Firm* — Morgan, Lewis & Bockius LLP

(57) ABSTRACT

A shift by wire-based transmission system and a method for controlling the same, may include a transmission lever, a main controller that determines a target gear stage and a current control delay time of an actuator based on a manipulation signal received from the transmission lever and controls driving of the actuator based on the determined target gear stage and the current control delay time to determine a gear stage position in a response to the driving of the actuator, and a transmission control unit that controls a hydraulic pressure based on the gear stage position determined by the main controller.

18 Claims, 7 Drawing Sheets

TRANSMISSION SYSTEM BASED ON SHIFT BY WIRE AND METHOD FOR CONTROLLING THE SAME

CROSS-REFERENCE TO RELATED APPLICATION

The present application claims priority to Korean Patent Application No. 10-2019-0044232, filed on Apr. 16, 2019, the entire contents of which is incorporated herein for all purposes by this reference.

BACKGROUND OF THE INVENTION

Field of the Invention

The present invention relates to a shift by wire-based transmission system and a method for controlling the same.

Description of Related Art

A shift by cable system refers to a system in which a transmission lever is physically connected to a transmission and a travel mode is changed as the transmission lever is manipulated to a park (P), reverse (R), neutral (N), or drive (D)-stage.

A conventional shift by cable (SBC) system may cause manipulation errors because a driver may manually manipulate and move the transmission lever. Furthermore, an accident may occur when the driver leaves a vehicle without manipulating the transmission lever to the park (P)-stage.

Recently, a shift by wire system that employs an electronic push button-based shift selector to allow electronic gear shifting without requiring the driver to manually shift a gear lever has been developed.

However, in a conventional shift by wire system, when shifting from a regenerative braking state in the D-stage to the N-stage, as a torque abruptly fluctuates due to a shortage of timing for a Transmission Control Unit (TCU) to enter a hydraulic pressure control, an impact may occur. Therefore, the driver may feel a sense of heterogeneity due to the impact.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a shift by wire-based transmission system that delays a motor current control of an actuator with reference to a delay map in which delay times are defined for each shift case when shifting by manipulating a shift by wire lever during a regenerative braking, securing a preparation time for hydraulic pressure control to minimize the sense of heterogeneity in the shifting.

The technical problems to be solved by the present inventive concept are not limited to the aforementioned problems, and any other technical problems not mentioned herein will be clearly understood from the following description by those skilled in the art to which an exemplary embodiment of the present invention pertains.

According to various aspects of the present invention, a shift by wire-based transmission system includes a transmission lever, a main controller that determines a target gear stage and a current control delay time of an actuator based on a manipulation signal received from the transmission lever and controls driving of the actuator based on the determined target gear stage and the current control delay time to determine a gear stage position in a response to the driving of the actuator, and a transmission control unit that controls a hydraulic pressure based on the gear stage position determined by the main controller.

The main controller may be configured to determine the current control delay time of the actuator when the manipulation signal of the transmission lever is received during traveling of the vehicle in a regenerative braking control state.

The main controller may be configured to determine the current control delay time of the actuator when the manipulation signal of the transmission lever is received while traveling of the vehicle in a brake ON state.

The main controller may be configured to determine the current control delay time of the actuator based on a predetermined delay map corresponding to a shift condition of the transmission lever.

The delay map may define delay times respectively corresponding to target input torques, oil temperatures, and input RPMs for each of a plurality of shift conditions.

The main controller may be configured to generate a current control signal corresponding to the target gear stage and apply the generated current control signal to the actuator when the current control delay time elapses.

Furthermore, the system according to an exemplary embodiment of the present invention may further include a position detection sensor that detects a change in a position of the actuator and transmits the detected position change to the main controller.

The position detection sensor may be an inhibitor sensor that detects a position of an inhibitor switch of the actuator.

The main controller may compare position information transmitted from the position detection sensor with target gear stage information and transmit final gear stage information to the transmission control unit.

The transmission lever may be of a shift by wire type.

According to various aspects of the present invention, a method for controlling a shift by wire-based transmission system includes determining, by a main controller, a target gear stage and a current control delay time of an actuator based on a manipulation signal of a transmission lever, controlling, by the main controller, driving of the actuator based on the determined target gear stage and the current control delay time, determining, by the main controller, a gear stage position in a response to the driving of the actuator, and controlling, by a transmission control unit, a hydraulic pressure based on the gear stage position determined by the main controller.

The determining of the target gear stage and the current control delay time of the actuator may include determining the current control delay time of the actuator when the manipulation signal of the transmission lever is received during traveling of the vehicle in a regenerative braking control state.

The determining of the target gear stage and the current control delay time of the actuator may include determining the current control delay time of the actuator when the manipulation signal of the transmission lever is received while traveling of the vehicle in a brake ON state.

The determining of the target gear stage and the current control delay time of the actuator may include determining the current control delay time of the actuator based on a predetermined delay map corresponding to a shift condition of the transmission lever.

The delay map may define delay times respectively corresponding to target input torques, oil temperatures, and input RPMs for each of a plurality of shift conditions.

The controlling of the driving of the actuator may include generating a current control signal corresponding to the target gear stage and applying the generated current control signal to the actuator when the current control delay time elapses.

Furthermore, the method according to an exemplary embodiment of the present invention may further include detecting, by a position detection sensor, a change in a position of the actuator after the controlling of the driving of the actuator.

The position detection sensor may be an inhibitor sensor that detects a position of an inhibitor switch of the actuator.

Furthermore, the method according to an exemplary embodiment of the present invention may further include comparing position information transmitted from the position detection sensor with target gear stage information, and transmitting final gear stage information to the transmission control unit based on the comparison result.

The transmission lever may be of a shift by wire type.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
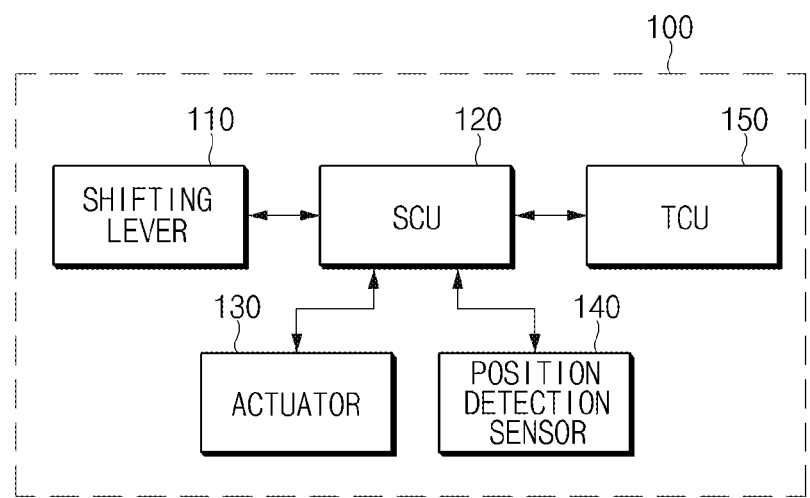
FIG. 1 illustrates a configuration of a shift by wire-based transmission system according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the exemplary drawings. In adding the reference numerals to the components of each drawing, it may be noted that the identical or equivalent component is designated by the identical numeral even when they are displayed on other drawings. Furthermore, in describing the exemplary embodiment of the present invention, a detailed description of well-known features or functions will be ruled out in order not to unnecessarily obscure the gist of the present invention.

In describing the components of the exemplary embodiment according to an exemplary embodiment of the present invention, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which an exemplary embodiment of the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 illustrates a configuration of a shift by wire-based transmission system according to an exemplary embodiment of the present invention. A shift by wire (SBW)-based transmission system according to an exemplary embodiment of the present invention refers to a shift by wire system that employs a shift by wire lever to eliminate a physical connection between a transmission lever and a transmission and electronically transmits and processes a manipulation signal of the transmission lever. For the convenience of description, the shift by wire (SBW)-based shift system will be referred to as a "transmission system" in a following description.

Referring to FIG. 1, a transmission system 100 may include a transmission lever 110, a main controller, an actuator 130, a position detection sensor 140, and a transmission control unit (hereinafter referred to as a TCU) 150.

The transmission lever 110 is shift manipulating means. A driver may manipulate the transmission lever 110 to select a gear stage. In the present connection, the transmission lever 110 may be a shift by wire lever 110. When the transmission lever 110 is moved to one of a P-stage, an R-stage, an N-stage, and a D-stage by the driver, the transmission lever 110 may transmit an electric signal corresponding to a gear stage of a moved position to the main controller.

In one example, the transmission lever 110 may be implemented in various forms such as a button type, a switch type, and the like.

The main controller controls a main operation of the SBW system. Hereinafter, the main controller will be referred to as a SCU (SBW control unit) 120.

When a manipulation signal of the transmission lever 110 is received, the SCU 120 determines a target gear stage based on the received manipulation signal of the transmission lever 110. In one example, when a manipulation signal of the transmission lever 110 corresponding to the N-stage is received while a vehicle is traveling in the D-stage, the SCU 120 may determine the target gear stage to be the N-stage.

In the present connection, the manipulation signal of the transmission lever 110 may include gear stage information related to a position to which the transmission lever 110 is manipulated among the P-stage, R-stage, N-stage, and D-stage.

When the target gear stage is determined based on the manipulation signal of the transmission lever 110, the SCU 120 controls the actuator 130 based on the determined target gear stage. At the instant time, the SCU 120 applies a current control signal corresponding to the target gear stage to the actuator 130.

The actuator 130 drives an inhibitor switch based on the current control signal from the SCU 120. When the target gear stage is determined, the SCU 120 may not directly apply the current control signal to the actuator 130, but may delay the application of the current control signal to the actuator 130 for a predetermined time to secure a hydraulic pressure control preparation time of the transmission.

In the present connection, the SCU 120 may determine the delay time based on a predetermined delay map. The delay map may include a plurality of delay maps for each shift case.

The SCU 120 may call delay map corresponding to the shift case among the delay maps defined for each shift case and determine the current control delay time of the actuator 130 based on the called delay map.

Embodiments of the delay maps defined for each shift case (conditions) will be described with reference to FIG. 2 and FIG. 3.

Figure 2:
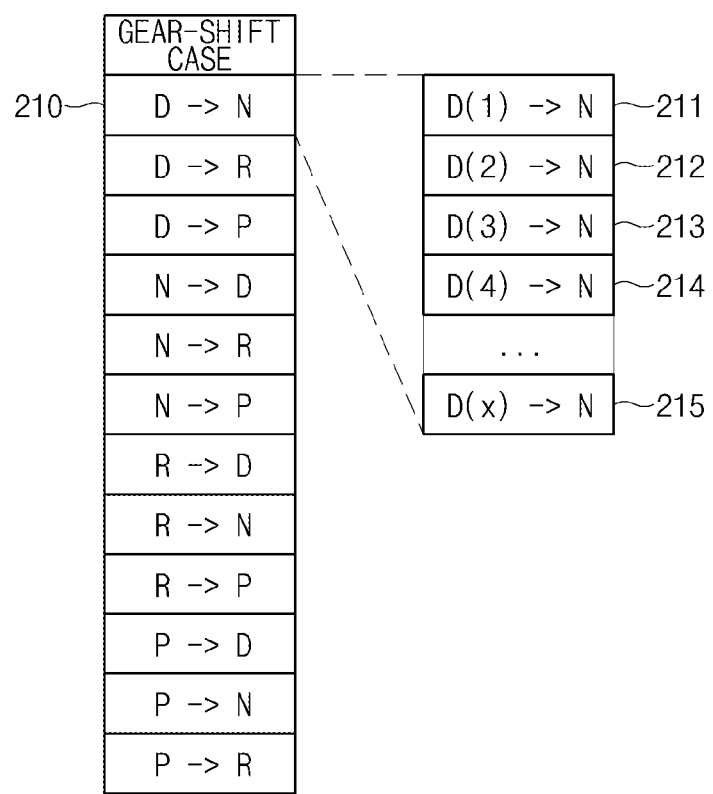
FIG. 2, FIG. 3, and FIG. 4 illustrate embodiments that are referenced to illustrate operations of a shift by wire-based transmission system according to an exemplary embodiment of the present invention.

Referring to FIG. 2, the shift cases may be divided into D→N, D→R, D→P, N→D, N→R, N→P, R→D, R→N, R→P, P→D, P→N, and P→R. In the present connection, the D-stage may be divided into a 1 to x stages. Therefore, the D→N case may be subdivided into 1 to x levels such as D(1)→N, D(2)→N, D(3)→N, D(4)→N, D(x)→N. Furthermore, the D→R and the D→P may also be subdivided based on levels of the D-stage.

In the present connection, delay maps may be defined for each of the divided shift cases.

The delay maps may be defined in a table with an oil temperature in x-axis and an input RPM value in y-axis. Furthermore, a delay time corresponding to each oil temperature and RPM may be defined in the table of the delay map. In the present connection, a plurality of delay maps may be respectively defined for target torques for one shift case.

Figure 3:
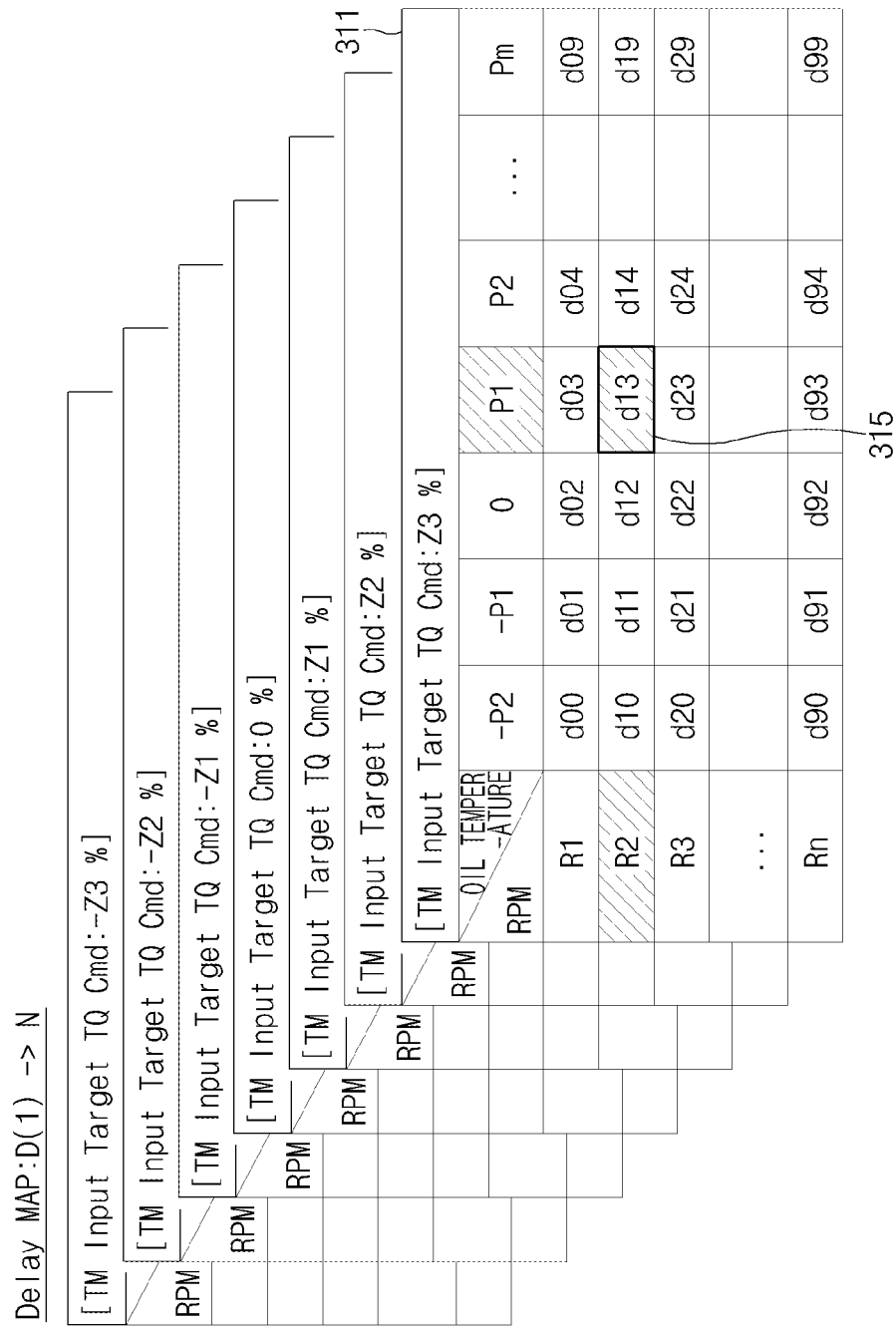

In one example, delay maps for the D(1)→N shift case may be shown as in FIG. 3.

Referring to FIG. 3, in the D(1)→N case, the delay maps may be defined for target torques of −Z3%, −Z2%, −Z1%, 0%, Z1%, Z2%, and Z3%, respectively.

In the present connection, in the delay maps respectively corresponding to the target torques of −Z3%, −Z2%, −Z1%, 0%, Z1%, Z2%, and Z3%, delay times 'd00' to 'd99' may be defined corresponding to oil temperatures of −P2 to Pm and input RPMs of R1 to Rn.

Therefore, when the target gear stage is determined to the N-stage from the current D(1)-stage, the SCU 120 may determine the delay time corresponding to a target torque, oil temperature, and input RPM in the delay maps defined corresponding to the D(1)→N shift case.

In one example, when the target torque is 'Z3%', the SCU 120 may determine the delay time based on a delay map of reference numeral 311. In the present connection, when the oil temperature is 'P1' and the input RPM is 'R2', the SCU 120 may determine 'd13' 315 corresponding to the oil temperature of 'P1' and to the input RPM of 'R2' as the delay time.

Accordingly, the SCU 120 allows the current control signal of the actuator 130 to be delayed by the determined delay time.

Likewise, while the SCU 120 delays the current control signal to be applied to the actuator 130, the TCU 150 may secure the preparation time for hydraulic pressure control of the transmission. When shifting to the N-stage during a regenerative braking control, the torque does not need to be fluctuated abruptly due to a shortage of the hydraulic pressure control entry timing of the TCU 150. Therefore, an impact due to the shift may be prevented.

When the current control signal is applied from the SCU 120 after the delay time has elapsed, the actuator 130 allows an inhibitor switch to be positioned at a position corresponding to the target gear stage based on the applied current control signal. The actuator 130 may be implemented as a motor.

The position detection sensor 140 detects a change in the position of the actuator 130. In one example, the position detection sensor 140 may be an inhibitor sensor that detects the position of the inhibitor switch.

The position detection sensor 140 detects the position of the inhibitor switch and transmits the detected position to the SCU 120.

Accordingly, the SCU 120 may recognize the position of the inhibitor switch based on information transmitted from the position detection sensor 140 and determine whether the inhibitor switch is positioned at the target gear stage. When the inhibitor switch is recognized not to be in the position of the target gear stage, the SCU 120 may apply the current control signal to the actuator 130 to move the position of the inhibitor switch to the position of the target gear stage.

When the inhibitor switch is recognized to be positioned at the position of the target gear stage, the SCU 120 transmits the gear stage information to the TCU 150.

Accordingly, when the gear stage information is received from the SCU 120, the TCU 150 controls a clutch hydraulic pressure of the transmission based on the received gear stage information. At the instant time, the TCU 150 drives a solenoid or a motor based on the gear stage information input from the SCU 120. The hydraulic pressure is applied on a hydraulic pressure circuit for each gear stage or blocked by operations of the driven solenoid or motor such that a shift control may be electronically performed.

In one example, when gear stage information related to the N-stage is input in the D(1)-stage state, the TCU 150 may release the hydraulic pressure applied on a D-stage hydraulic pressure circuit to form the N-stage.

Figure 4:
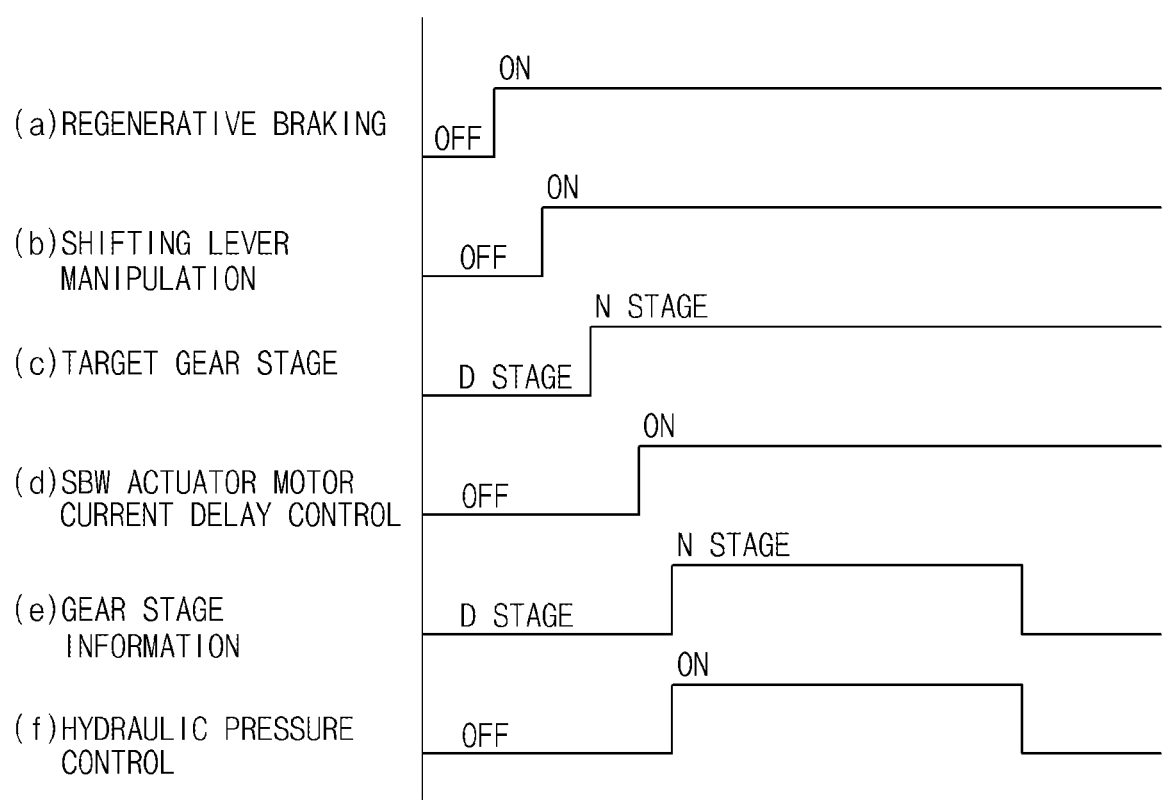

State changes in each operation of the transmission system described above will be referred to an exemplary embodiment in FIG. 4. The exemplary embodiment in FIG. 4 shows state changes when shifting from the D-stage to the N-stage during traveling of the vehicle under a regenerative braking control state.

Referring to FIG. 4, when the transmission lever 110 is turned ON from the D-stage to the N-stage as shown in (b) in a state where the regenerative braking control is ON as shown in (a), the SCU 120 determines the N-stage as the target gear stage as shown in (c) based on the manipulation signal received from the transmission lever 110.

Thereafter, the SCU 120 may call a predetermined delay map of D-stage→N-stage based on the shift condition (D-stage→N-stage) of the transmission lever 110 and determine the current control delay time from the called delay map. At the instant time, the SCU 120 performs the current delay control of the actuator 130 based on the current control delay time as shown in (d).

The gear stage may move from the D-stage to the N-stage as shown in (e) by the current delay control of the actuator 130 in (d). Accordingly, the TCU 150 performs the hydraulic pressure control based on the N-stage, which is the gear stage moved as shown in (f). In the present connection, in a response to the D-stage→N-stage shift, the TCU 150 may release the hydraulic pressure, which has been previously applied on the D-stage, thus to form the N-stage.

Although not shown in FIG. 1, the transmission lever 110, the SCU 120, and the TCU 150 of the transmission system 100 may include a communication module for a vehicle network communication. In the present connection, a vehicle network communication technology may include a Controller Area Network (CAN) communication, a Local Interconnect Network (LIN) communication, a Flex-Ray communication, and the like.

Furthermore, the transmission system 100 may further include storage means in which the predetermined delay maps for each shift case are stored. In the present connection, the storage means may include at least one storage medium of a Random Access Memory (RAM), a Static Random Access Memory (SRAM), a Read-Only Memory (ROM), a Programmable Read-Only Memory (PROM), or an Electrically Erasable Programmable Read-Only Memory (EEPROM).

The transmission system 100 according to the exemplary embodiment operating as described above may be implemented in a form of an independent hardware device including a memory and a processor that processes each operation and may be implemented in a form which is included in another hardware device such as a microprocessor or a general purpose computer system.

Figure 5:
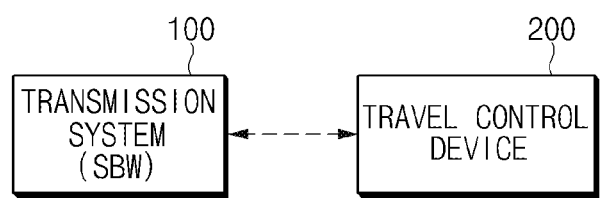
FIG. 5 is a diagram illustrating a configuration of a vehicle to which a shift by wire-based transmission system according to an exemplary embodiment of the present invention is applied.

FIG. 5 is a diagram illustrating a configuration of a vehicle device to which a transmission system according to an exemplary embodiment of the present invention is applied.

As shown in FIG. 5, the vehicle device may include the shift by wire-based transmission system 100 and a travel control device 200.

The transmission system 100 corresponds to the transmission system 100 described in the exemplary embodiments in FIG. 1, FIG. 2, FIG. 3, and FIG. 4. Therefore, duplicate descriptions of the same functions and operations of the transmission system 100 will be omitted.

When the transmission lever is manipulated during traveling of the vehicle in the regenerative braking control state or a brake ON state, the transmission system 100 delays the driving of the actuator based on the delay map corresponding to the shift condition of the transmission lever and controls the hydraulic pressure in a state in which the preparation of the hydraulic pressure control of the TCU is completed, performing stable shifting.

In the present connection, when the shift is completed by the transmission system 100, a travel control device may control the traveling of the vehicle based on a changed gear stage.

An operation flow of the shift by wire-based transmission system according to an exemplary embodiment of the present invention configured as described above will be described in more detail as follows.

Figure 6:
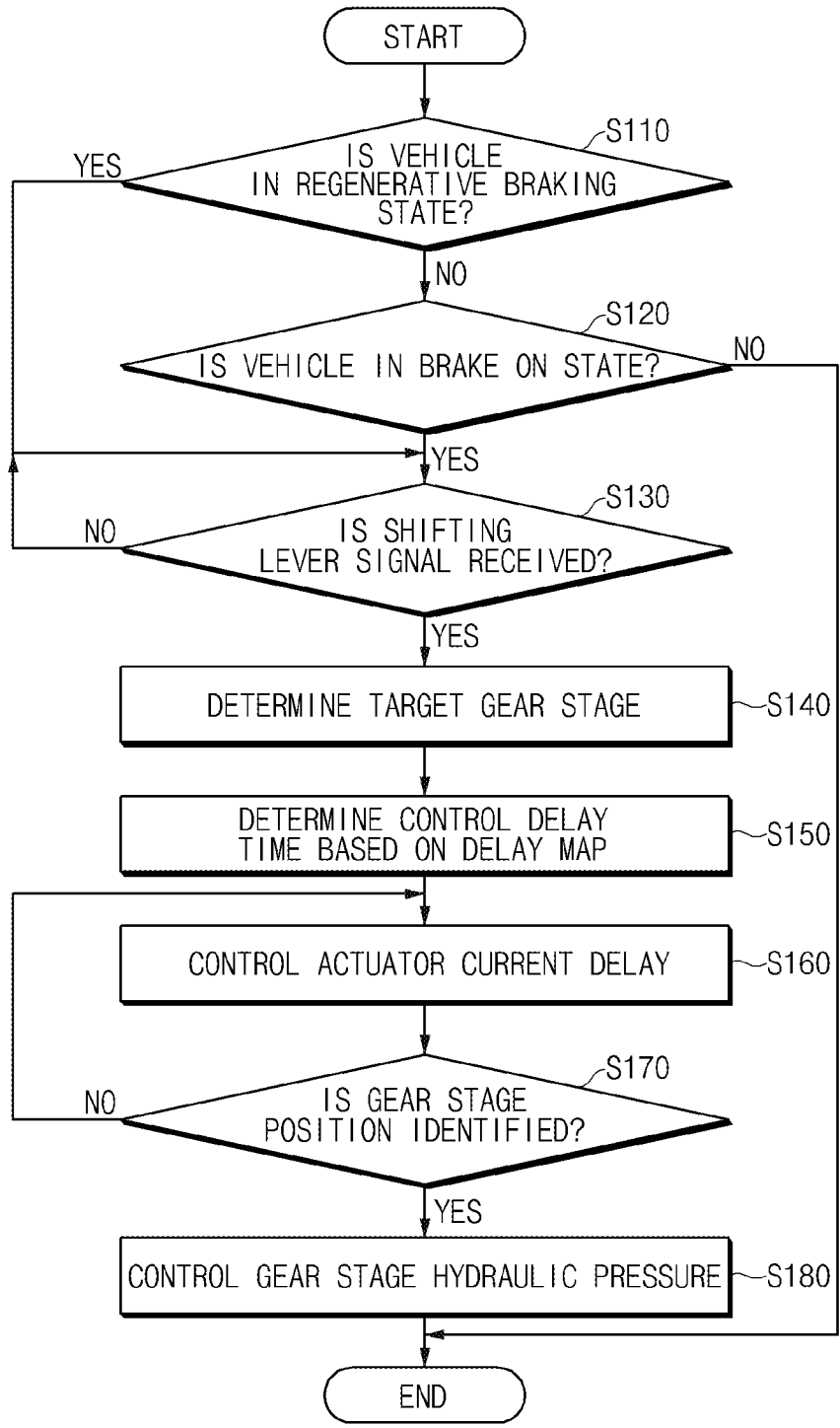
FIG. 6 is a flowchart illustrating a method for controlling a shift by wire-based transmission system according to an exemplary embodiment of the present invention.

FIG. 6 is a flowchart illustrating a method for controlling a shift by wire-based transmission system according to an exemplary embodiment of the present invention.

Referring to FIG. 6, the SCU 120 of the transmission system 100 monitors whether the transmission lever 110 is manipulated in the regenerative braking control state in S110 during the traveling or in the brake ON state in S120.

When the manipulation signal of the transmission lever 110 is received in a state other than the regenerative braking control state and the brake ON state, the SCU 120 and the TCU 150 of the transmission system may perform the shift based on conventional shift control logic.

On the other hand, when the manipulation signal of the transmission lever 110 is received in S130 in the regenerative braking control state in S110 or in the brake ON state in S120, the SCU 120 of the transmission system determines the target gear stage in S140 based on gear stage information included in the manipulation signal of the transmission lever 110 received in S130.

When the target gear stage is determined in S140, the SCU 120 of the transmission system determines the current control delay time of the actuator 130 in S150 based on the delay map defined corresponding to the shift case.

The SCU 120 of the transmission system delays the current control of the actuator 130 in S160 by the delay time determined in S150. At the instant time, the TCU 150 of the transmission system may perform preparations for the hydraulic pressure controlling of the transmission during the current control delay time of the actuator 130.

The SCU 120 of the transmission system applies the current control signal corresponding to the target gear stage to the actuator 130 after the current control delay time elapses. At the instant time the SCU 120 identifies the position of the inhibitor switch driven by the actuator 130 in S170. In the present connection, the SCU 120 of the transmission system may identify the position of the inhibitor switch via the inhibitor sensor.

When the gear stage position of the inhibitor switch is identified as the target gear stage position, the SCU 120 of the transmission system transmits the identified gear stage information to the TCU 150. Accordingly, the TCU 150 controls the hydraulic pressure of the transmission in S180 based on the gear stage information received from the SCU 120.

Therefore, the transmission system may perform the shift control stably in the regenerative control state.

Figure 7:
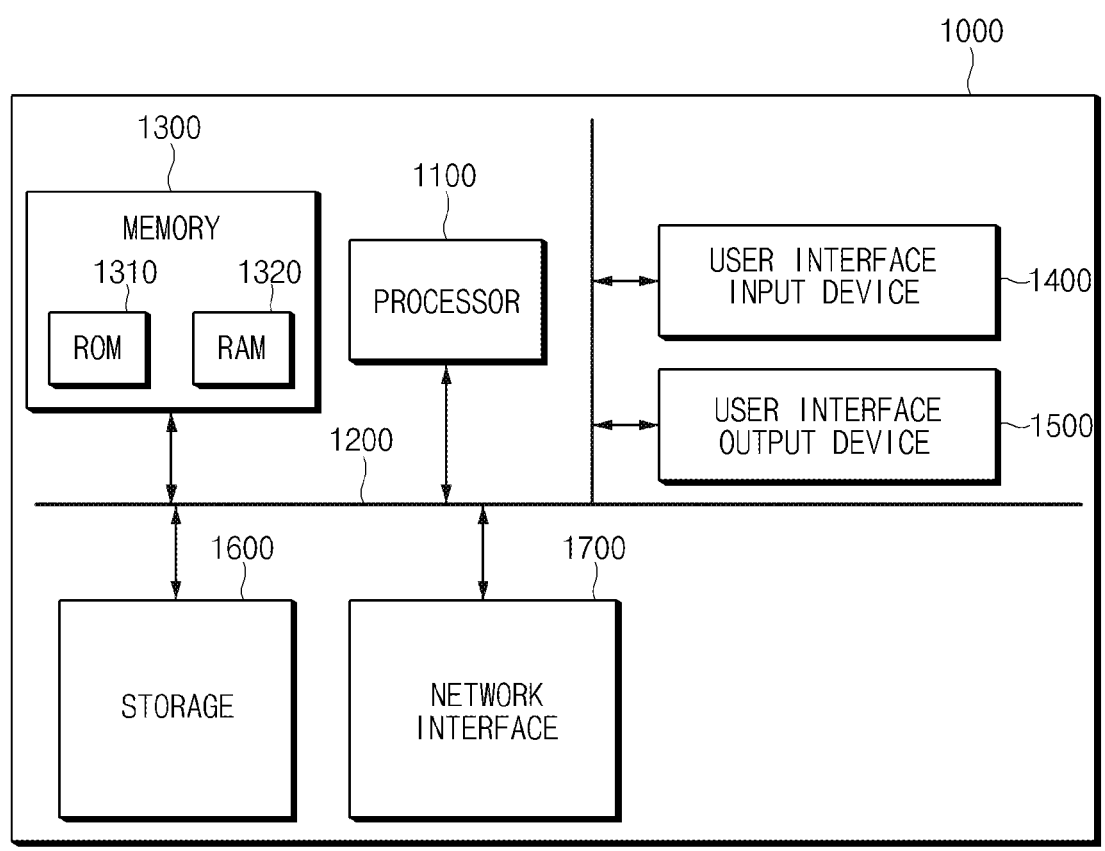
FIG. 7 illustrates a computing system in which a method according to an exemplary embodiment of the present invention is implemented.

FIG. 7 illustrates a computing system in which a method according to an exemplary embodiment of the present invention is implemented.

Referring to FIG. 7, a computing system 1000 may include at least one processor 1100, a memory 1300, a user interface input device 1400, a user interface output device 1500, storage 1600, and a network interface 1700, which are connected to each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the exemplary embodiments included herein may be embodied directly in hardware or a software module executed by the processor 1100, or in a combination thereof. The software module may reside on a storage medium (that is, the memory 1300 and/or the storage 1600) such as a RAM memory, a flash memory, a ROM, an EPROM, an EEPROM, a register, a hard disk, a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

According to an exemplary embodiment of the present invention, when shifting by manipulating the shift by wire lever during the regenerative braking, the delay map in which the delay times are defined for each shift case is referenced to delay the motor current control of the actuator. Thus, the preparation time for the hydraulic pressure control is sufficiently secured, minimizing the sense of heterogeneity in the shifting.

Hereinabove, although the present invention has been described with reference to exemplary embodiments and the accompanying drawings, the present invention is not limited thereto, but may be variously modified and altered by those skilled in the art to which an exemplary embodiment of the present invention pertains without departing from the spirit and scope of the present invention claimed in the following claims.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A shift by wire-based transmission system comprising:
    a transmission lever;
    a main controller configured to determine a target gear stage and a current control delay time period of an actuator based on a manipulation signal received from the transmission lever and to control operation of the actuator based on the determined target gear stage and the current control delay time period to determine a gear stage position in a response to the operation of the actuator; and
    a transmission control unit connected to the main controller and configured to control a hydraulic pressure of a transmission based on the gear stage position determined by the main controller,
    wherein the main controller is configured to determine the current control delay time period of the actuator upon determining that the manipulation signal of the transmission lever is received during traveling of the vehicle in a regenerative braking control state.

2. The shift by wire-based transmission system of claim 1, wherein the main controller is configured to determine the current control delay time period of the actuator upon determining that the manipulation signal of the transmission lever is received while traveling of the vehicle in a brake ON state.

3. The shift by wire-based transmission system of claim 1, wherein the main controller is configured to determine the current control delay time period of the actuator based on a predetermined delay map corresponding to at least a shift condition of the transmission lever.

4. The shift by wire-based transmission system of claim 3, wherein the at least a shift condition includes a plurality of shift conditions, and
    wherein the predetermined delay map defines delay times respectively corresponding to target input torques, oil temperatures, and input revolutions per minute for each of the plurality of shift conditions.

5. The shift by wire-based transmission system of claim 1, wherein the main controller is configured to generate a current control signal corresponding to the target gear stage and applies the generated current control signal to the actuator upon determining that the current control delay time period elapses.

6. The shift by wire-based transmission system of claim 1, further including:
    a position detection sensor connected to the main controller and configured to detect a change in a position of the actuator and transmit the detected position change to the main controller.

7. The shift by wire-based transmission system of claim 6, wherein the position detection sensor is an inhibitor sensor configured to detect a position of an inhibitor switch of the actuator.

8. The shift by wire-based transmission system of claim 6, wherein the main controller is configured to compare position information transmitted from the position detection sensor with target gear stage information and to transmit final gear stage information to the transmission control unit.

9. The shift by wire-based transmission system of claim 1, wherein the transmission lever is of a shift by wire.

10. A method of controlling a shift by wire-based transmission system, the method comprising:
    determining, by a main controller, a target gear stage and a current control delay time period of an actuator based on a manipulation signal of a transmission lever;
    controlling, by the main controller, operation of the actuator based on the determined target gear stage and the current control delay time;
    determining, by the main controller, a gear stage position in a response to the operation of the actuator; and
    controlling, by a transmission control unit, a hydraulic pressure of a transmission based on the gear stage position determined by the main controller, wherein the determining of the target gear stage and the current control delay time period of the actuator includes:
  determining the current control delay time period of the actuator upon determining that the manipulation signal of the transmission lever is received during traveling of a vehicle in a regenerative braking control state.

11. The method of claim 10, wherein the determining of the target gear stage and the current control delay time period of the actuator includes:
  determining the current control delay time period of the actuator upon determining that the manipulation signal of the transmission lever is received while traveling of the vehicle in a brake ON state.

12. The method of claim 10, wherein the determining of the target gear stage and the current control delay time period of the actuator includes:
  determining the current control delay time period of the actuator based on a predetermined delay map corresponding to at least a shift condition of the transmission lever.

13. The method of claim 12,
  wherein the at least a shift condition of the transmission lever includes a plurality of shift conditions, and
  wherein the predetermined delay map defines delay times respectively corresponding to target input torques, oil temperatures, and input revolutions per minute for each of the plurality of shift conditions.

14. The method of claim 10, wherein the controlling of the operation of the actuator includes:
  generating a current control signal corresponding to the target gear stage and applying the generated current control signal to the actuator upon determining that the current control delay time period elapses.

15. The method of claim 10, further including:
  detecting, by a position detection sensor, a change in a position of the actuator after the controlling of the operation of the actuator.

16. The method of claim 15, wherein the position detection sensor is an inhibitor sensor configured to detect a position of an inhibitor switch of the actuator.

17. The method of claim 15, further including:
  comparing, by the main controller, position information transmitted from the position detection sensor with target gear stage information; and
  transmitting, by the main controller, final gear stage information to the transmission control unit based on a result of comparing the position information transmitted from the position detection sensor with the target gear stage information.

18. The method of claim 10, wherein the transmission lever is of a shift by wire.

* * * * *